United States Patent [19]
Schwarzkopf

[11] 3,908,554
[45] Sept. 30, 1975

[54] SELF-PROPELLED AMUSEMENT-PARK RAIL VEHICLE

[75] Inventor: Anton Schwarzkopf, Munsterhausen, Germany

[73] Assignee: Firma Anton Schwarzkopf, Munsterhausen, Germany

[22] Filed: Mar. 27, 1974

[21] Appl. No.: 455,320

[30] Foreign Application Priority Data
Nov. 15, 1973 Germany............................ 2357156

[52] U.S. Cl................. 104/53; 104/63; 104/147 R; 104/245; 105/30
[51] Int. Cl.² ......................................... A63G 21/04
[58] Field of Search..... 104/53, 63, 148 LM, 172 R, 104/244, 245, 247, 147 R; 105/30

[56] References Cited
UNITED STATES PATENTS

| | | | |
|---|---|---|---|
| 2,316,223 | 4/1943 | Chêneau............................ | 105/30 |
| 3,618,531 | 11/1971 | Eichaolz ........................ | 104/245 X |
| 3,707,125 | 12/1972 | Milenkovic et al............. | 104/246 X |
| 3,727,560 | 4/1973 | Blemly et al..................... | 105/30 X |
| 3,807,312 | 4/1974 | Flodell............................. | 105/30 X |

Primary Examiner—M. Henson Wood, Jr.
Assistant Examiner—Randolph A. Reese
Attorney, Agent, or Firm—Karl F. Ross; Herbert Dubno

[57] ABSTRACT

A self-propelled amusement-park vehicle, adapted to ride on a pair of running rails and to drive itself on a drive rail located between the running rails, has a pair of units each comprising a rubber drive wheel engaging a respective lateral face of the drive rail, and mounted on an upright shaft which is connected at its upper end via a right-angle drive to the drive motor of the vehicle. Each drive unit is pivotal about an axis extending generally parallel to the drive rail which is parallel to the normal direction of travel of the vehicle, and a spring is provided which urges the lower end of the shaft mounting the wheel toward the drive rail so that the wheel is pressed against the respective face of the drive rail. The spring urging the drive wheel into engagement with the drive rail is received in a hollow shaft constituting the pivot axis for the support wheels. The vehicle has in each corner a pair of hyperboloidal support wheels which ride on the running rails of the system. Each pair of such wheels is mounted in a support which pivoted about the respective hollow shaft on the housing of the vehicle.

7 Claims, 4 Drawing Figures

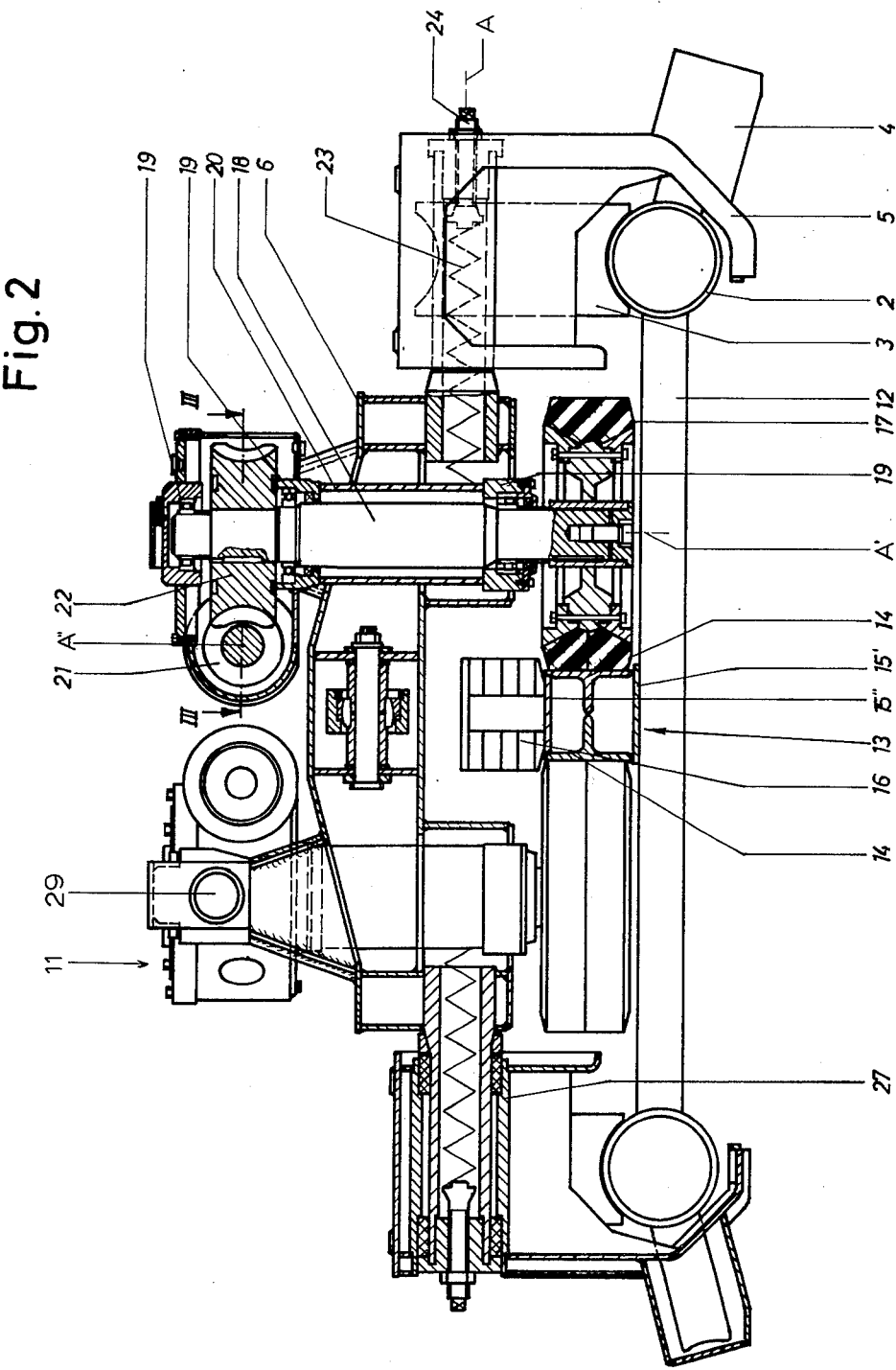

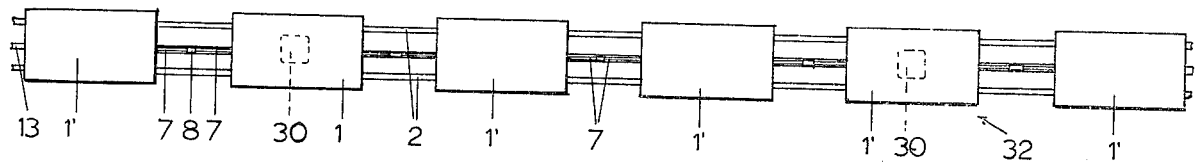
Fig. 4
Fig. 3
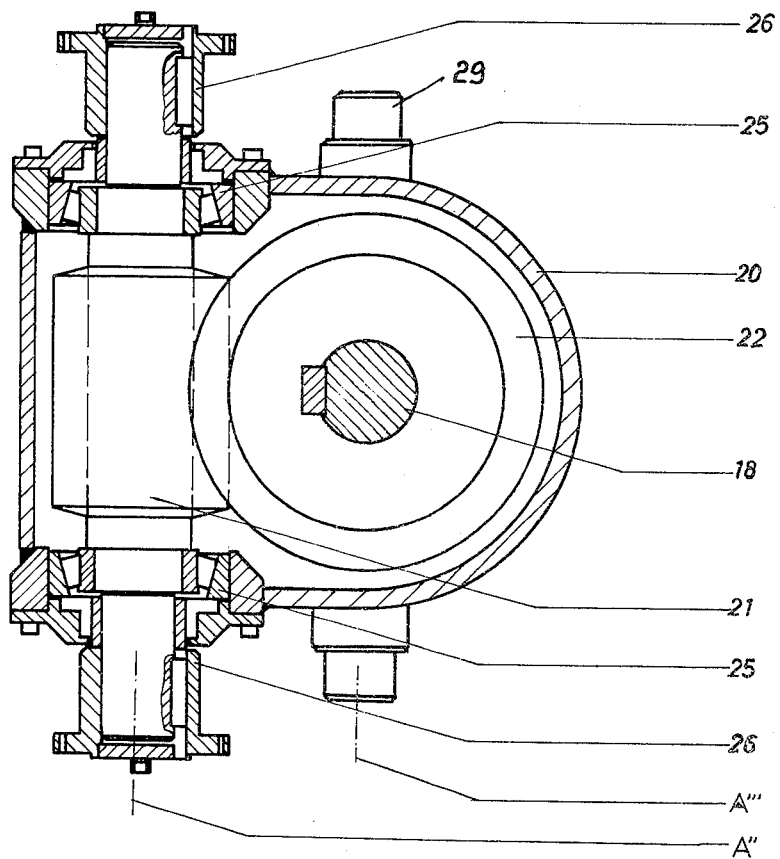

SELF-PROPELLED AMUSEMENT-PARK RAIL VEHICLE

CROSS REFERENCE TO RELATED APPLICATION

This application is related to my copending application Ser. No. 239,016 filed on 29 Mar. 1972 (now Pat. No. 3,855,936).

FIELD OF THE INVENTION

The present invention relates to a self-propelled rail vehicle. More particularly this invention concerns an amusementpark vehicle such as is used on a roller coaster or the like.

BACKGROUND OF THE INVENTION

A conventional roller coaster has a single vehicle or a train of vehicles which ride on a pair of parallel rails defining a course that ascends and descends. Usually the start of the course has a high point followed by progressively decreasingly high summits. The vehicle or vehicles are pulled to the top of the first summit whence they are released and descend at high speed, inertially rising to the tops of the subsequent peaks which are of decreasing height so that the vehicle can ascend them by inertia alone.

It is also known to provide such an arrangement with a self-propelled vehicle or train so that a relatively long course can be used without the necessity of providing an extremely high initial peak so as to impart to the vehicle or train the necessary speed to complete the course. In one particular arrangement of such an amusement device the vehicle is provided with a pair of support wheels that ride on spaced apart running rails. A drive rail between the running rails is engaged by a drive wheel that is pressed down against this drive rail so as to engage it frictionally. The drive wheel is powered by an electric motor receiving its electricity from a bus bar carried next to the drive rail or on this drive rail.

Such an arrangement has the considerable disadvantage that the force urging the drive wheel against the drive rail tends to lift the vehicle from the running rail. Thus the train of vehicles sits relatively insecurely on the running rail, as the drive wheel tends to carry part of the weight of the vehicle. The drive wheel therefore tends to wear excessively. In addition the pressure which the drive wheel exerts on the drive rail is proportional to the weight of the vehicle, so that fully loaded this pressure will be greater and, therefore, the force-transmission from the wheel to the rail is increased, whereas when the vehicle is empty the drive wheel may not bear sufficiently on the drive rail to propel it.

OBJECTS OF THE INVENTION

It is therefore an object of the present invention to provide an improved self-propelled vehicle.

Another object of this invention is the provision of an improved amusement-park rail vehicle which overcomes the abovegiven disadvantages.

A further object is the provision of an improved drive system for a self-propelled amusement park vehicle of the abovedescribed general type.

SUMMARY OF THE INVENTION

These objects are attained according to the present invention in a self-propelled vehicle having a housing provided with wheels adapted to ride on a pair of parallel running rails. A drive motor in this housing is connected via a right-angle drive to a shaft carrying a drive wheel rotatable with the shaft about an axis generally transverse to the generally horizontal rotation axes of the running wheels and adapted to ride against the side of a drive rail located between the two running rails. This drive shaft for the drive wheel is mounted in an arm which is pivoted on the housing about an axis extending generally parallel to the drive rail, in line with the normal direction of travel of the vehicle. Means, such as a spring, is provided to press the drive wheel against the drive rail with a predetermined force.

Such an arrangement insures that the drive wheel engages the drive rail with an unvarying force. Since the wheel is pressed laterally against the drive wheel the extent to which the vehicle is loaded has no effect. Neither will the curve or shape of the drive rail have any effect, since the outer periphery of the wheel merely rides on one lateral face of this drive rail and is subjected to none of the twisting forces which the prior art systems had to withstand.

The right-angle drive according to this invention can comprise a pinion carried on the drive shaft for the drive wheel and meshing with a worm, or a bevel gear on this drive shaft meshing with another bevel gear driven by the electric drive motor of the vehicle. The pivot axis of the arm carrying the right-angle drive is coincident with or parallel to and offset from the rotation axis of the drive element, whether that be a worm or a bevel gear. This drive element is connected via a universal joint to the drive motor, and may be connected via a shaft and further universal joint to the drive element of a similar drive system in another vehicle connected behind or in front of the vehicle carrying the drive motor. Thus the vehicle according to the present invention may be used alone, or a single self-propelled vehicle may be used to propel another one or two further vehicles. In accordance with this invention it is envisaged that the single powered vehicle is provided between a pair of unpowered vehicles so as to drive the two, thereby forming short self-propelled trains each formed of three vehicles.

According to yet another feature of the present invention there is provided on each vehicle a pair of such arms each to one side of the drive rail and each provided with a respective drive wheel pressed inwardly by a spring against the drive rail. Thus the drive rail is gripped between the two drive wheels and there is therefore no loss of traction on curves.

In accordance with a further feature of the present invention the means urging the drive wheel against the drive rail is a spring received within a hollow shaft acting as a pivot for a support carrying a pair of longitudinally spaced support wheels. The vehicle is supported on four such supports each having two such drive wheels, and since each support is limitedly pivotal about an axis transverse to the normal direction of travel of the vehicle it is possible for these wheels to follow a curved track while remaining in contact with the rail. The provision of the biasing spring within the pivot shaft of each support allows it to be adjusted from without the vehicle while the motion of the support relative to the vehicle will not affect this adjustment.

BRIEF DESCRIPTION OF THE DRAWING

The above and other objects, features, and advantages will become more readily apparent from the following, reference being made to the accompanying drawing in which:

FIG. 2 is a cross section through the rear of the vehicle shown in FIG. 1;

FIG. 3 is a section taken along line III—III of FIG. 2; and

FIG. 4 is a top view in greatly reduced scale showing a train according to the present invention.

SPECIFIC DESCRIPTION

Figure 1:
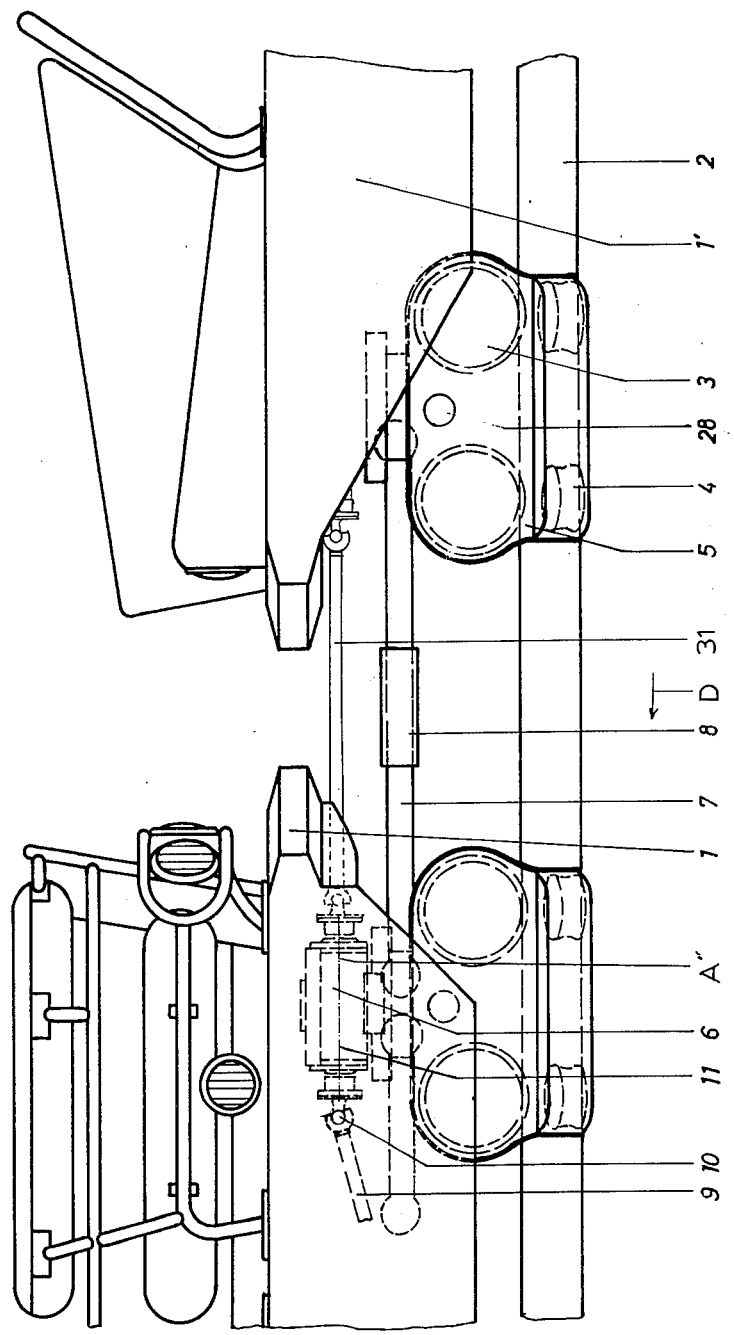
FIG. 1 is a side view showing the back of one vehicle and the front of another vehicle according to the present invention.

As shown in FIG. 4 a train 32 is formed of six vehicles, two of which are driven vehicles 1, and four of which are non-driven vehicles 1'. This train 32 rides on a trails formed by a pair of parallel spaced-apart rails 2 of round section as shown in FIG. 2. Such a train 32 is used in a roller-coaster type ride, or as a scenic railway or overhead transport.

As shown in FIGS. 1 and 2 each vehicle 1, 1' is supported on eight hyperboloidal wheels 3 mounted by pairs on supports 5 pivotal about respective axes A relative to the housing 6 of the vehicle. In addition each support 5 is provided with a pair of secondary wheels 4 each adjacent a support wheel 3 and inclined downwardly at an angle from and engaging the respective rail 2 so as to prevent the vehicle 1, 1' from lifting off these rails 2. Each vehicle 1, 1' is provided with a coupling shaft 7 extending in the direction D of normal displacement of the vehicle and connected to the shaft 7 of the following or preceding vehicle by means of a coupling 8. In the embodiment shown in FIG. 4 the train 32 has six cars, so that the front and rear cars are connected to other cars at only one end.

The powered vehicles 1 are each provided with a respective drive motor 30 having an output shaft connected via a pair of cardan shafts 9 and universal joints 10 to flanges 26 of a pair of right-angle drive units 11 adjacent the supports 5. Each right-angle drive 11 is connected via another shaft 31 to the corresponding right-angle drive of the following or preceding vehicle 1'.

The rails 2 are interconnected by transverse struts 12 which support a drive rail 13 formed of a pair of T-beams 14 having their flanges turned toward each other and mounted on a lower plate 15' carried on the struts 12 and bridged by an upper plate 15" carrying a bus bar 16 which supplies electricty to the motor 30.

Between each pair of supports 5 there is provided a pair of rubber drive wheels 17 each rotatable with a shaft 18 about a vertical axis A' perpendicular to and spaced from the axis A" of the input of the respective right-angle drive 11. The shaft 18 is supported by bearings 19 in an angularly displaceable arm 20 formed with gudgeons 29 shown in FIG. 3 which define a pivot axis A''' parallel to the axis A" and perpendicular to and intersecting the axis A' of the respective shaft 18. Each shaft 18 is keyed at its upper end to a large pinion 22 meshing with a worm 21, these two gears 21 and 22 constituting the right-angle drive 11. The arm 20 also can be pivoted about the respective axis A", and, as shown, carries the entire drive train rotating the respective drive wheel.

The running-wheel supports 5 are each supported on a respective shaft 28 which extends between the wheels and lies on the axis A. Each shaft 28 is hollow as shown at 27 and is provided internally with a compression spring 23 having one end bearing on the lower end of the arm 20 and another end bearing on an adjustment element 24 which can be displaced longitudinally in the respective spindle 28. Thus this spring 23 pushes the respective wheel 17 against the drive rail 13. The amount of spring force exerted by spring 23 is therefore determined by the displaceable abutment 24, so that screwing it in gives increased pressure of the respective wheel 17 against the rail 13, and therefore increased coupling of the drive wheel thereto, whereas screwing this adjustment out decreases the coupling force.

The system according to the present invention uses the drive wheels solely to propel the vehicle along the track 2. It does not tend to lift them off these tracks, indeed it aids in holding the train 32 down. Since the tires 17 engage the lateral surface of the drive beam 13 they are not affected by curves and the service life of these tires is long.

I claim:

1. A self-propelled amusement-park vehicle adapted to ride on a pair of stationary parallel running rails and to propel itself on a stationary drive rail between said running rails, said vehicle comprising:

a housing;

support wheels on said housing engageable with said running rails permitting said housing to roll therealong;

a pair of angularly displaceable drive arms flanking said drive rail, each arm having a lower end adjacent said drive rail and an upper end said lower end displaceable angularly with respect to its upper end;

respective means defining a respective pivot between said housing and each of said upper ends for displacement of the respective lower end laterally toward and away from said drive rail, said pivots being parallel to said drive rail;

a respective drive wheel at each of said lower ends and rotatable about an axis transverse to said drive rail;

a respective spring bearing on each arm for urging the respective lower end toward said drive rail and thereby pressing said drive wheels against said drive rail;

a respective right-angle drive mounted wholly on each of said arms and having an output at the respective lower end carrying the respective drive wheel and an input at the respective upper end; and a motor in said housing connected to said inputs for rotating said wheels with said drives to propel said housing along said running rails.

2. The vehicle defined in claim 1 wherein each arm comprises a rigid casing extending transversely to said drive rail, and enclosing the respective right-angle drive.

3. The vehicle defined in claim 2 wherein each right angle drive includes a worm at said input, a pinion meshing therewith, and a shaft carrying said pinions and the respective wheel.

4. The vehicle defined in claim 3, further comprising a universal joint between said motor and each of said inputs.

5. The vehicle defined in claim 1 wherein said housing is provided with a plurality of supports each carrying a pair of said support wheels and pivotal on said housing about an axis transverse to said running rails.

6. The vehicle defined in claim 5 wherein said housing includes a plurality of hollow pivot shafts each constituting the pivot axis of a respective support, said springs of said means for urging each being received within a respective hollow shaft.

7. The vehicle defined in claim 1 wherein said drive rails includes a pair of like T-beams each having a flange turned toward the other T-beam.

* * * * *